(12) United States Patent
Hashimoto et al.

(10) Patent No.: US 7,965,063 B2
(45) Date of Patent: Jun. 21, 2011

(54) INVERTER GENERATOR

(75) Inventors: Shoji Hashimoto, Wako (JP); Kazufumi Muronoi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 149 days.

(21) Appl. No.: 12/505,784

(22) Filed: Jul. 20, 2009

(65) Prior Publication Data
US 2010/0020571 A1 Jan. 28, 2010

(30) Foreign Application Priority Data

Jul. 25, 2008 (JP) ................................ 2008-191780

(51) Int. Cl.
*H20P 11/00* (2006.01)
(52) U.S. Cl. ....................................................... 322/37
(58) Field of Classification Search .................... 322/37, 322/37 R, 32, 34, 40 R, 24, 20, 29, 45, 59; 290/40 C, 40 R; 318/158
See application file for complete search history.

(56) References Cited

U.S. PATENT DOCUMENTS

| | | | |
|---|---|---|---|
| 5,055,765 A | 10/1991 | Rozman et al. | |
| 5,239,253 A | 8/1993 | Shimizu et al. | |
| 6,949,902 B2 * | 9/2005 | Nakayama et al. | 318/432 |
| 7,102,332 B1 * | 9/2006 | Sasaki et al. | 322/28 |
| 7,183,750 B2 * | 2/2007 | Asada | 322/59 |
| 2003/0039130 A1 | 2/2003 | Curtiss | |

FOREIGN PATENT DOCUMENTS

| | | |
|---|---|---|
| EP | 1289117 A2 | 3/2003 |
| JP | 4-355672 A | 12/1992 |

* cited by examiner

*Primary Examiner* — T C Patel
*Assistant Examiner* — Iraj A Mohandesi
(74) *Attorney, Agent, or Firm* — Arent Fox LLP

(57) ABSTRACT

In an inverter generator having an engine generator unit, a converter that converts generated alternating current to direct current, an inverter that converts the direct current to alternating current with switching elements to supply to an electrical load, an inverter driver that drives the switching elements with a PWM signal and makes the alternating current of a predetermined frequency, the alternating current supplied to the electrical and voltages of the direct and alternating currents are detected, the detected voltage of the alternating current is corrected as a predetermined value based on a coefficient (DCgainA) set based on the detected voltage of the direct current, when the detected alternating current is greater than a threshold value, and the PWM signal is corrected by the predetermined, thereby limiting overcurrent.

10 Claims, 4 Drawing Sheets

INVERTER GENERATOR

BACKGROUND OF THE INVENTION

1. Field of the Invention

This invention relates to an inverter generator, particularly to an inverter generator equipped with a generator unit driven by an internal combustion engine and adapted to limit overcurrent.

2. Description of the Related Art

One well-known inverter generator once converts the alternating current outputted by an engine-driven generator unit to direct current and then converts the direct current into alternating current of a predetermined frequency (utility frequency) by driving switching elements with a PWM signal generated using a reference sine wave of the desired output voltage waveform and a carrier. An example of such an inverter generator can be found in Japanese Laid-Open Patent Application No. H4(1992)-355672.

In such the inverter generator taught by the reference, an overcurrent limiter circuit is provided to protect the switching elements from overcurrent caused by short-circuit or inrush load. When the detected current exceeds the tolerance limit, the circuit makes a PWM signal supplied to the switching elements zero to drop the output current zero temporarily.

SUMMARY OF THE INVENTION

The overcurrent can thus be prevented once by the overcurrent limiter circuit. Since, however, the output current is made zero, the PWM signal is again supplied so that the current again exceeds the tolerance limit, then the PWM signal is again made zero so that the output current is made zero temporarily, and it goes on. It is disadvantageous that a series of the same events is repeated. Further, since the tolerance limit is set to a relatively high value, it is preferable to limit the overcurrent at a level lower than the set limit value.

This invention is therefore directed to overcoming the aforesaid problem by providing an inverter generator that conducts conversion to alternating current of a predetermined frequency based on a PWM signal generated using a reference sine wave of the desired output voltage waveform and a carrier, wherein overcurrent can be reliably limited or restricted.

In order to achieve the object, this invention provides in its first aspect an inverter generator having a generator unit that is driven by an internal combustion engine and generates alternating current, a converter that is connected to the generator unit and converts the alternating current to direct current, an inverter that is connected to the converter and converts the direct current to alternating current with switching elements to supply to an electrical load, an inverter driver that drives the switching elements with a PWM signal generated using a reference sine wave of a desired output voltage waveform and a carrier at every control cycle and makes the alternating current converted in the inverter to the alternating current of a predetermined frequency, comprising: a current detector that detects the alternating current supplied to the electrical load; a direct current voltage detector that detects voltage of the direct current converted by the converter; an alternating current voltage detector that detects voltage of the alternating current supplied by the inverter; an output voltage corrector that corrects the detected voltage of the alternating current as a predetermined value based on a coefficient set based on the detected voltage of the direct current, when the detected alternating current is greater than a threshold value; and a PWM signal corrector that corrects the PWM signal by the predetermined value at the control cycle, such that the detected alternating current becomes less than the threshold value.

In order to achieve the object, this invention provides in its second aspect a method of controlling an inverter generator having a generator unit that is driven by an internal combustion engine and generates alternating current, a converter that is connected to the generator unit and converts the alternating current to direct current, an inverter that is connected to the converter and converts the direct current to alternating current with switching elements to supply to an electrical load, an inverter driver that drives the switching elements with a PWM signal generated using a reference sine wave of a desired output voltage waveform and a carrier at every control cycle and makes the alternating current converted in the inverter to the alternating current of a predetermined frequency, comprising the steps of: detecting the alternating current supplied to the electrical load; detecting voltage of the direct current converted by the converter; detecting voltage of the alternating current supplied by the inverter; correcting the detected voltage of the alternating current as a predetermined value based on a coefficient set based on the detected voltage of the direct current, when the detected alternating current is greater than a threshold value; and correcting the PWM signal by the predetermined value at the control cycle, such that the detected alternating current becomes less than the threshold value.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

An inverter generator according to an embodiment of this invention will now be explained with reference to the attached drawings.

Figure 1:
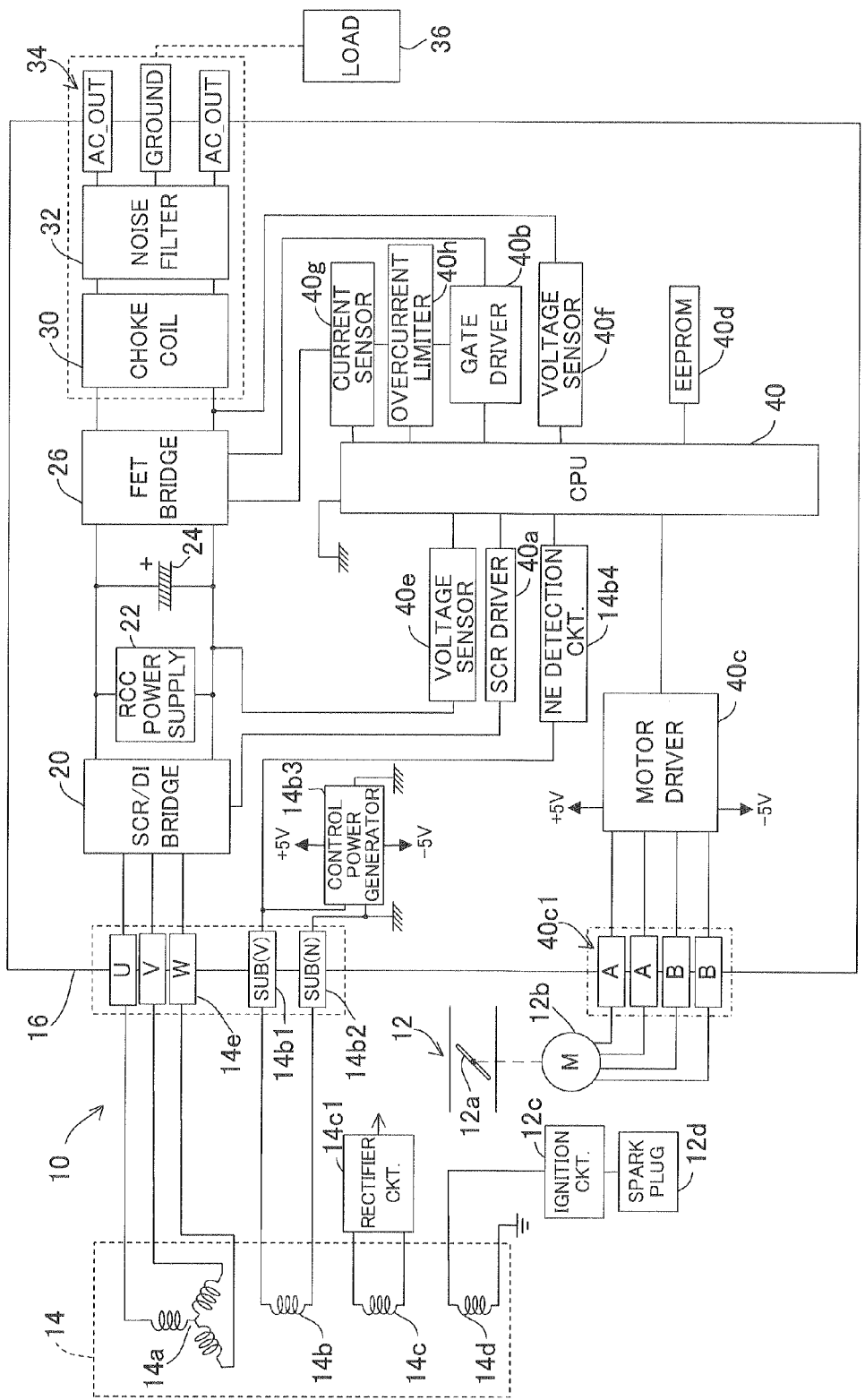
FIG. 1 is a block diagram giving an overview of an inverter generator according to an embodiment of this invention.

FIG. 1 is a block diagram giving an overview of an inverter generator according to an embodiment of this invention.

The inverter generator is designated by reference numeral 10 in FIG. 1. The generator 10 is equipped with an engine (internal combustion engine) 12 and has a rated output of about 3 kW (AC 100 V, 30 A). The engine 12 is an air-cooled, spark-ignition engine. Its throttle valve 12*a* is opened and closed by a throttle motor (actuator) 12*b* constituted as a stepper motor. The engine 12 is started with a recoil starter (not shown).

A circular stator (not shown) is fastened near the cylinder head of the engine 12. The stator is provided with windings that constitute an engine generator unit 14, namely with three-phase (U, V and W) output windings (main windings) 14*a* and three single-phase windings 14*b*, 14*c* and 14*d*.

A rotor (not shown) that doubles as the flywheel of the engine 12 is installed in the outside of the stator. Permanent magnets (not shown) are attached in the rotor at positions opposite the aforesaid windings 14a etc. and with their radially oriented polarities reversed alternately.

When the permanent magnets of the rotor surrounding the stator rotate, three-phase (U, V and W phase) alternating current is outputted from (generated by) the three-phase output windings 14a and single-phase alternating current is outputted from the single-phase output windings 14b, 14c and 14d.

The three-phase alternating current outputted from (generated by) the output windings 14a of the generator unit 14 is passed through U, V and W terminals 14e to a control board (printed board) 16 and inputted to a converter 20 mounted thereon. The converter 20 is equipped with bridge-connected three thyristors (SCRs) and three diodes DI. The three-phase alternating current outputted by the generator unit 14 is converted to direct current by controlling the conduction angles of the thyristors.

A ringing choke converter (RCC) power supply (direct current stabilized power supply) 22 is connected to the positive and negative electrode side outputs of the converter 20 and supplies the rectified DC power to the three thyristors as operating power. A smoothing capacitor 24 is connected downstream of the RCC power supply 22 to smooth the direct current outputted from the converter 20.

An inverter 26 is connected downstream of the smoothing capacitor 24. The inverter 26 is equipped with a four-FET bridge circuit (FET: field effect transistor (switching element)). As explained further below, the direct current outputted from the converter 20 is converted to alternating current of a predetermined frequency (50 Hz or 60 Hz utility power frequency) by controlling the conducting (ON-OFF) state of the four FETs.

The output of the inverter 26 is passed through a choke coil 30 composed of an LC filter for harmonic suppression and through a noise filter 32 for noise suppression to be applied to output terminals 34, from which it can be supplied to an electrical load 36 through a connector (not shown) or the like.

The control board 16 is equipped with a CPU (central processing unit) 40 having a 32-bit architecture. The CPU 40 controls the conduction angle of the thyristors of the converter 20 though a thyristor (SCR) driver (drive circuit) 40a, the conducting state of the FETs of the inverter 26 through a gate driver 40b, and the operation of the throttle motor 12b through a motor driver 40c. The CPU 40 is equipped with an EEPROM (nonvolatile memory) 40d.

The output of the first single-phase output winding 14b is sent to the control board 16 through sub-terminals 14b1 and 14b2, where it is inputted to a control power generator 14b3 that generates 5 V operating power for the CPU 40. The output from the sub-terminal 14b1 is sent to an NE detection circuit 14b4, where it is converted to a pulse signal and sent to the CPU 40. The CPU 40 counts the pulses of the output from the NE detection circuit 14b4 to calculate (detect) the speed NE of the engine 12.

The output of the second output winding 14c is sent to a full-wave rectifier circuit 14c1, where it is full-wave rectified to produce operating power for, inter alia, the throttle motor 12b. The output of the third output winding 14d is sent to an ignition circuit 12c of the engine 12 for use as ignition power for a spark plug 12d.

The CPU 40 is connected to first and second voltage sensors (detectors) 40e and 40f. The first voltage sensor 40e on downstream of the RCC power supply 22 produces an output or signal proportional to the DC voltage output of the converter 20. The second voltage sensor 40f on downstream of the inverter 26 produces an output or signal proportional to the AC voltage output of the inverter 26. The outputs of the first and second voltage sensors 40e and 40f are sent to the CPU 40.

The CPU 40 is further connected to a current sensor (detector) 40g. The current sensor 40g produces an output or signal proportional to the current outputted from the inverter 26, i.e., the current passing through the electrical load 36 when the load 36 is connected.

The output of the current sensor 40g is inputted to the CPU 40 and also to an overcurrent limiter 40h constituted as a logic circuit (hardware circuit) independent of the CPU 40. When the current detected by the current sensor 40g exceeds a tolerance limit, the overcurrent limiter 40h suspends the output of the gate driver 40b to make the output of the inverter 26 zero temporarily.

The CPU 40 is inputted with the outputs of the first and second voltage sensors 40e, 40f and current sensor 40g and based thereon, PWM-controls the FETs of the inverter 26, controls the operation of the throttle motor 12b, and further controls overcurrent limiting.

Figure 2:
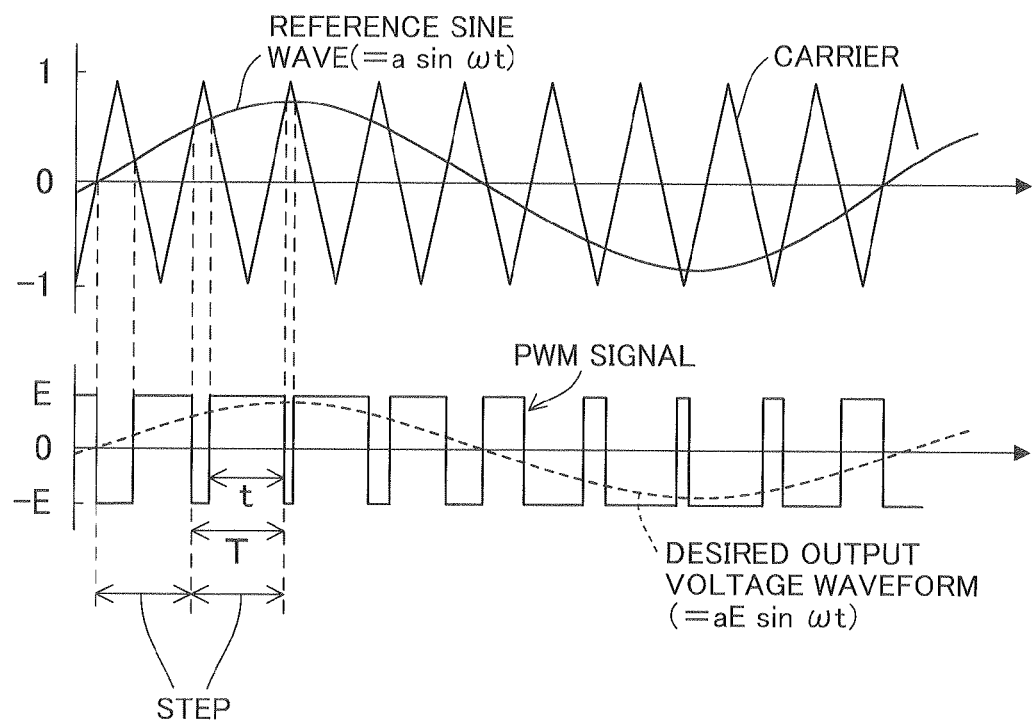
FIG. 2 is a waveform diagram for explaining a PWM control by a CPU shown in FIG. 1.

FIG. 2 is a waveform diagram for explaining the PWM control by the CPU 40.

Explaining the PWM control on the FETs of the inverter 26 with reference to FIG. 2, based on a reference sine wave (signal wave) with respect to the predetermined frequency (50 Hz or 60 Hz utility power frequency) of the desired AC output voltage waveform (lower broken-line wave), the CPU 40 uses a comparator (not shown) to compare it with a carrier (e.g., a 20 kHz carrier wave), produces a PWM signal (PWM waveform), namely a variable duty ratio (=ON time t/period T) pulse train, in accordance with PWM (pulse width modulation), and outputs the signal through the gate driver 40b.

The lower broken-line wave in FIG. 2 indicates the desired output voltage waveform. The period T (step) of the PWM signal (PWM waveform), which is actually much shorter than shown, is enlarged in FIG. 2 for ease of understanding.

The CPU 40 determines the opening of the throttle valve 12a to establish the desired engine speed calculated based on the AC output consumed by the electrical load 36, calculates A phase and B phase output pulses for the throttle stepper motor 12b, and supplies them through the motor driver 40c to the throttle stepper motor 12b from output terminals 40c1, thereby controlling the operation of the throttle motor 12b.

Next, among the control operations of the CPU 40, the operation of overcurrent limiting control will be explained.

Figure 3:
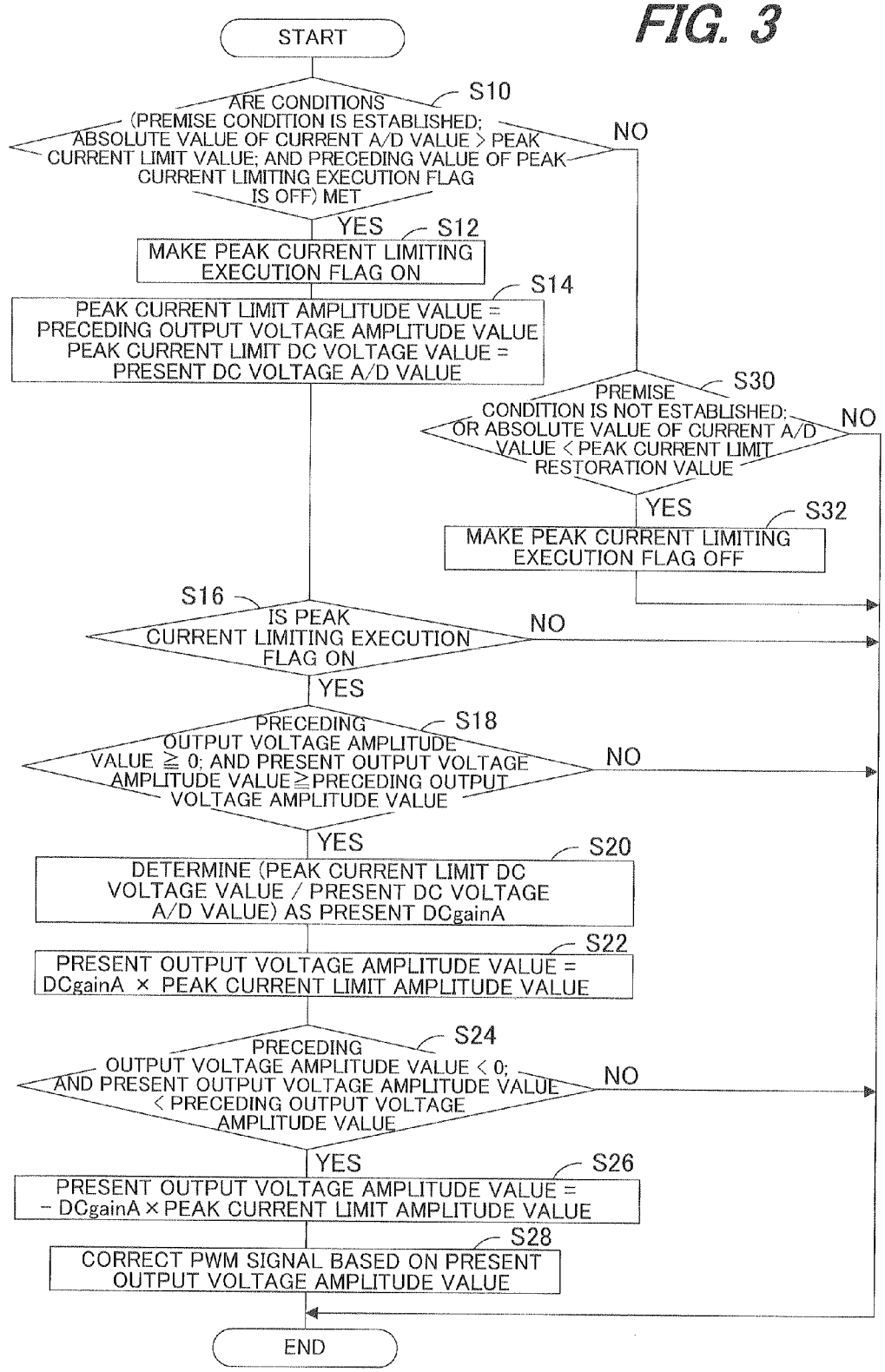
FIG. 3 is a flowchart showing the operation of the CPU shown in FIG. 1.

FIG. 3 is a flowchart showing the operation.

The illustrated program is executed at every predetermined control cycle, for example every 50 microseconds in the case where the frequency of the carrier shown in FIG. 2 is 20 kHz and the frequency of the output voltage waveform is 50 Hz. More specifically, it is executed every step in the graph of FIG. 2.

Explaining in the following, the program begins in S10, in which it is determined whether control starting conditions are met. The control starting conditions are that a premise condition is established, that an absolute value of A/D converted value (effective value) of the current detected by the current sensor 40g is greater than a peak current limit value (threshold value), and that the bit of a peak-current-limiting-execution flag (explained later) was OFF in the preceding program execution of the FIG. 3 flowchart.

The premise condition is a power factor being equal to or greater than 0.9. The peak current limit value is set to be lower than the tolerance limit used by the overcurrent limiter 40h.

Figure 4:
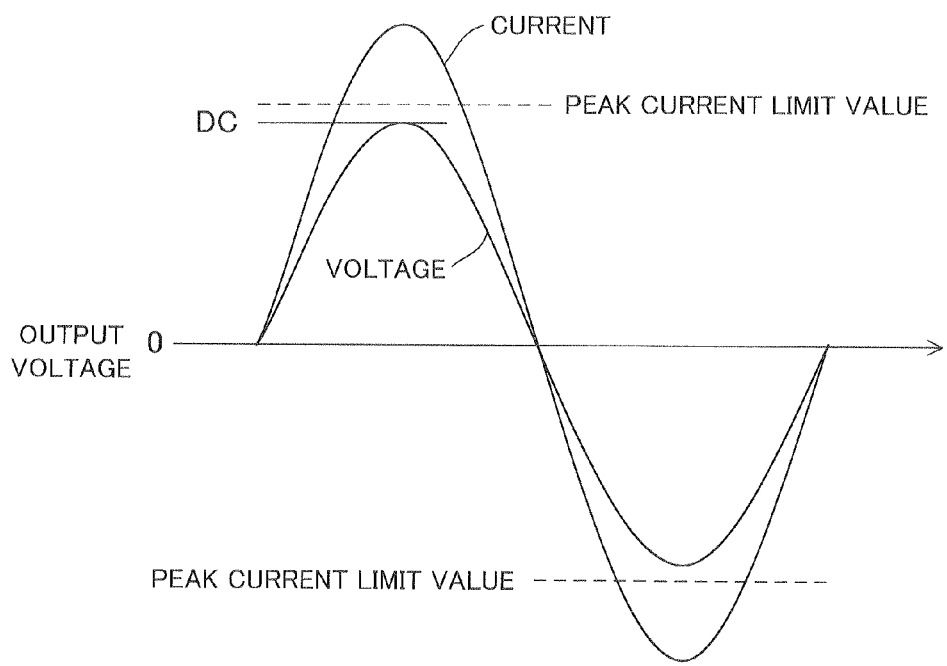
FIG. 4 is a waveform diagram showing an AC voltage waveform outputted from an inverter shown in FIG. 1.
Figure 5:
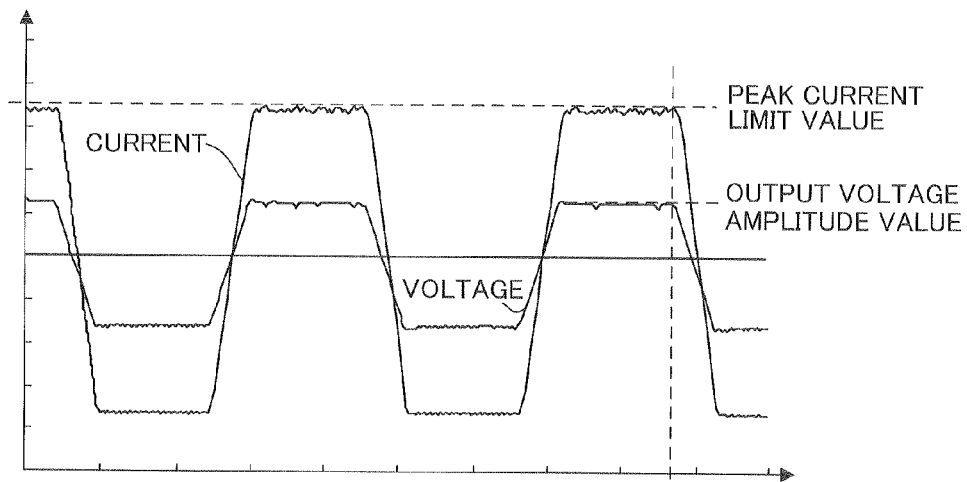
FIG. 5 is a time chart for explaining the processing in the flowchart of FIG. 3.

FIG. 4 is a waveform diagram showing an AC voltage waveform outputted from the inverter 26 and FIG. 5 is a time chart for explaining the control operation in the flowchart of FIG. 3.

As shown in FIGS. 4 and 5, in the control operation, if the current exceeds the peak current limit value, the voltage (corresponding to the current) is controlled to reduce the current to a value below the peak current limit value. Accordingly, when the phase difference between the current and voltage is large, in other words the force factor is small, it becomes difficult to determine the correspondence of the current and voltage. For that reason, the power factor being equal to or greater than 0.9 is included as one of the control starting conditions.

In addition, since the peak current limit value is set on both of the positive and negative sides, the A/D converted value of the detected current is compared with the limit value in terms of the absolute value.

The explanation of FIG. 3 flowchart is resumed.

When the result in S10 is Yes, the program proceeds to S12, in which the bit of the peak-current-limiting-execution flag is made ON, i.e., set to 1, and to S14, in which the output voltage amplitude value in the preceding program execution, i.e., the output voltage amplitude value in the preceding control cycle is read and renamed (and stored) as a peak current limit amplitude value, and a DC voltage A/D value in the present program execution, i.e., a DC voltage A/D value in the present control cycle is read and renamed (and stored) as a peak current limit DC voltage value. The DC voltage is the voltage of direct current outputted from the converter 20.

The program proceeds to S16, in which it is determined whether the bit of the peak-current-limiting-execution flag is ON and when the result is No, the remaining steps are skipped. When the result is Yes, the program proceeds to S18, in which it is determined whether the output voltage amplitude value at the preceding control cycle is equal to or greater than zero and whether the output voltage amplitude value at the present control cycle is equal to or greater than that in the preceding control cycle, i.e., it is determined whether it is in the rising stage on the positive side in the graph of FIG. 4.

When the result in S18 is No, the remaining steps are skipped and when the result is Yes, the program proceeds to S20, in which the peak current limit DC voltage value stored in S14 is divided by the DC voltage A/D value at the present control cycle and the obtained quotient is determined as a DC voltage fluctuation coefficient DCgainA at the present control cycle.

Thus, the DC voltage fluctuation coefficient DCgainA means a quotient obtained by dividing the peak current limit DC voltage value by the DC voltage A/D value at the present control cycle. Since the peak current limit DC voltage value is also the DC voltage A/D value at the present control cycle renamed and stored in S14, the DC voltage fluctuation coefficient DCgainA will be a coefficient indicating the fluctuation rate of the DC voltage.

The program then proceeds to S22, in which the peak current limit amplitude value is multiplied by the DC voltage fluctuation coefficient DCgainA determined or calculated in S20 and the obtained product is determined as the output voltage amplitude value at the present control cycle.

Since the peak current limit amplitude value is the output voltage amplitude value at the preceding control cycle renamed and stored in S14, the above processing amounts to determining a value obtained by multiplying the output voltage amplitude value at the preceding control cycle by the DC voltage fluctuation coefficient DCgainA as the output voltage amplitude value at the present control cycle.

The program then proceeds to S24, in which it is determined whether the output voltage amplitude value at the preceding control cycle is less than zero and whether the output voltage amplitude value at the present control cycle is less than that in the preceding control cycle, i.e., it is determined whether it is in the rising stage on the negative side in the graph of FIG. 4.

When the result is No, the remaining steps are skipped and when the result is Yes, the program proceeds to S26, in which, similarly to the foregoing processing, a product (negative value) obtained by multiplying the peak current limit amplitude value by the DC voltage fluctuation coefficient DCgainA is determined as the output voltage amplitude value at the present control cycle.

The program next proceeds to S28, in which the PWM signal is corrected based on the output voltage amplitude value at the present control cycle. Specifically, the duty ratio in the graph of FIG. 2 is decreased to make the output voltage waveform trapezoidal as shown in FIG. 5.

When the result in S10 is No, the program proceeds to S30, in which it is determined whether the premise condition (the power factor is equal to or greater than 0.9) is not established or whether the absolute value of the current A/D converted value (effective value) is less than a peak current limit restoration value. When the result is No, the remaining steps are skipped and when the result is Yes, the program proceeds to S32, in which the aforementioned flag is made OFF, i.e., the bit thereof is reset to zero and the program is terminated.

The operation of FIG. 3 flowchart will be explained with reference to FIG. 5.

As described above, the inverter generator 10 is unable to limit current and hence can only limit voltage to limit the overcurrent. In view of this, in the embodiment, the generator 10 is configured to limit the voltage to a value at the time when the current exceeds the peak current limit value, i.e., to the peak current limit amplitude value at that control cycle (program execution).

Further, the inverter 26 of the generator 10 can not output alternating current greater in voltage than direct current outputted from the converter 20. In addition, as explained above, the operation of the throttle motor 12b is controlled in accordance with the AC output determined by the electrical load 36. At any rate, the voltage in direct current or alternating current must fluctuate in terms of instantaneous value.

This embodiment is therefore configured to obtain the DC voltage fluctuation coefficient and multiply the limit value (peak current limit amplitude value) by the coefficient. Owing to this configuration, when the current is about to exceed the peak current limit value, the output voltage can be limited to a certain constant value regardless of fluctuation in the electrical load 36, as shown in FIG. 5.

When the current becomes below the peak current limit restoration value, the limiting operation is canceled and the output voltage waveform is restored or returned to the sine waveform as shown in FIG. 2. The peak current limit restoration value is set in the vicinity of the peak current limit value for avoiding control hunting.

As stated above, the embodiment is configured to have an inverter generator (10) (and a method of controlling the inverter generator (10)) having a generator unit (14) that is driven by an internal combustion engine (12) and generates alternating current, a converter (20) that is connected to the generator unit and converts the alternating current to direct current, an inverter (26) that is connected to the converter and converts the direct current to alternating current with switching elements to supply to an electrical load (36), an inverter driver (CPU 40) that drives the switching elements with a PWM signal generated using a reference sine wave of a desired output voltage waveform and a carrier at every control cycle and makes the alternating current converted in the inverter to the alternating current of a predetermined frequency, characterized by: a current detector (CPU 40, 40g, S10) that detects the alternating current supplied to the electrical load (36); a direct current voltage detector (CPU 40, 40e) that detects voltage of the direct current converted by the converter; an alternating current voltage detector (CPU 40, 40f) that detects voltage of the alternating current supplied by the inverter; an output voltage corrector (CPU 40, S10 to S26) that corrects the detected voltage of the alternating current (output voltage amplitude value) as a predetermined value (output voltage amplitude value) based on a coefficient (DC voltage fluctuation coefficient DCgainA) set based on the detected voltage of the direct current, when the detected alternating current is greater than a threshold value (peak current limit value); and a PWM signal corrector (CPU 40, S28) that corrects the PWM signal by the predetermined value at the control cycle, such that the detected alternating current becomes less than the threshold value.

Thus, it is configured to detect the current supplied to the load 36, the voltage of direct current outputted from the converter 20 and the voltage of alternating current outputted from the inverter 26, correct the detected DC voltage to a predetermined value based on a value set in accordance with the detected DC voltage when the detected current exceeds the threshold value (peak current limit value), correct the PWM signal used for operating the switching element in every control cycle based on the corrected value, thereby decreasing the current to a value below the threshold value. With this, since the AC output voltage can be held at the predetermined value when the current exceeds the threshold value, it becomes possible to limit the current at a constant level below the threshold value, thereby reliably limiting overcurrent.

More specifically, although the inverter generator 10 can not directly control the current due to its attributes, it controls the voltage instead of the current, thereby decreasing the current to a value below the threshold value. Further, since the voltage is controlled based on the inputted DC voltage, it becomes possible to reliably decrease the current to a value below the threshold value regardless of fluctuation in the electrical load 36.

In the generator, the coefficient (DCgainA) is set based on the detected voltages at different control cycles, specifically the coefficient is set based on a ratio of the detected voltages at different control cycles, more specifically the coefficient is set based on a ratio of the detected voltages at preceding control cycle and present control cycle (S10).

In the generator, the output voltage corrector corrects the detected voltage of the alternating current as the predetermined value when a power factor is equal to or greater than a prescribed value (S10).

In the generator, the current detector detects the alternating current as an effective value based on an detected value obtained by a current sensor (40g).

It should be noted that, in the embodiment, the term of the "preceding control cycle" is not limited to a value one cycle before but can be a value two or more cycles before or an average of values in multiple cycles.

Although a ratio is used to obtain the coefficient (DC voltage fluctuation coefficient DCgainA) set based on the voltage of direct current detected in the FIG. 3 flowchart, a difference can be utilized instead.

Although FETs are used as the switching elements of the inverter in the foregoing, this is not a limitation and it is possible to use insulated gate bipolar transistors (IGBTs) or the like instead.

Japanese Patent Application No. 2008-191780 filed on Jul. 25, 2008, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An inverter generator having a generator unit that is driven by an internal combustion engine and generates alternating current, a converter that is connected to the generator unit and converts the alternating current to direct current, an inverter that is connected to the converter and converts the direct current to alternating current with switching elements to supply to an electrical load, an inverter driver that drives the switching elements with a PWM signal generated using a reference sine wave of a desired output voltage waveform and a carrier at every control cycle and makes the alternating current converted in the inverter to the alternating current of a predetermined frequency, comprising:
a current detector that detects the alternating current supplied to the electrical load;
a direct current voltage detector that detects voltage of the direct current converted by the converter;
an alternating current voltage detector that detects voltage of the alternating current supplied by the inverter;
an output voltage corrector that corrects the detected voltage of the alternating current as a predetermined value based on a coefficient set based on the detected voltage of the direct current, when the detected alternating current is greater than a threshold value; and
a PWM signal corrector that corrects the PWM signal by the predetermined value at the control cycle, such that the detected alternating current becomes less than the threshold value.

2. The inverter generator according to claim 1, wherein the coefficient is set based on the detected voltages at different control cycles.

3. The inverter generator according to claim 2, wherein the coefficient is set based on a ratio of the detected voltages at different control cycles.

4. The inverter generator according to claim 1, wherein the output voltage corrector corrects the detected voltage of the alternating current as the predetermined value when a power factor is equal to or greater than a prescribed value.

5. The inverter generator according to claim 1, wherein the current detector detects the alternating current as an effective value based on an detected value obtained by a current sensor.

6. A method of controlling an inverter generator having a generator unit that is driven by an internal combustion engine and generates alternating current, a converter that is connected to the generator unit and converts the alternating current to direct current, an inverter that is connected to the converter and converts the direct current to alternating current with switching elements to supply to an electrical load, an inverter driver that drives the switching elements with a PWM signal generated using a reference sine wave of a desired output voltage waveform and a carrier at every control cycle and makes the alternating current converted in the inverter to the alternating current of a predetermined frequency, comprising the steps of:

detecting the alternating current supplied to the electrical load;

detecting voltage of the direct current converted by the converter;

detecting voltage of the alternating current supplied by the inverter;

correcting the detected voltage of the alternating current as a predetermined value based on a coefficient set based on the detected voltage of the direct current, when the detected alternating current is greater than a threshold value;

and correcting the PWM signal by the predetermined value at the control cycle, such that the detected alternating current becomes less than the threshold value.

7. The method according to claim 6, wherein the coefficient is set based on the detected voltages at different control cycles.

8. The method according to claim 7, wherein the coefficient is set based on a ratio of the detected voltages at different control cycles.

9. The method according to claim 6, wherein the step of output voltage correction corrects the detected voltage of the alternating current as the predetermined value when a power factor is equal to or greater than a prescribed value.

10. The method according to claim 6, wherein the step of current detection detects the alternating current as an effective value based on an detected value obtained by a current sensor.

* * * * *